United States Patent
Lee et al.

(10) Patent No.: US 12,001,482 B2
(45) Date of Patent: Jun. 4, 2024

(54) METHOD OF GENERATING INTEGRATED GRAPH USING DISTRIBUTED GRAPH

(71) Applicant: S2W INC., Seongnam-si (KR)

(72) Inventors: Chan Hee Lee, Suwon-si (KR); Jae Min Choi, Seongnam-si (KR); Soo Yeon Park, Seoul (KR); Keun Tae Park, Seoul (KR)

(73) Assignee: S2W INC., Seongnam-si (KR)

( * ) Notice: Subject to any disclaimer, the term of this patent is extended or adjusted under 35 U.S.C. 154(b) by 14 days.

(21) Appl. No.: 17/842,226

(22) Filed: Jun. 16, 2022

(65) Prior Publication Data
US 2023/0252079 A1 Aug. 10, 2023

(30) Foreign Application Priority Data
Feb. 4, 2022 (KR) .................. 10-2022-0014540

(51) Int. Cl.
*G06F 16/90* (2019.01)
*G06F 16/901* (2019.01)

(52) U.S. Cl.
CPC .............................. *G06F 16/9024* (2019.01)

(58) Field of Classification Search
CPC .... G06F 16/9024; G06F 16/28; G06F 16/367; G06F 16/84
See application file for complete search history.

(56) References Cited

U.S. PATENT DOCUMENTS

| 2016/0224645 A1* | 8/2016 | Dang | G06F 16/254 |
| 2022/0138261 A1* | 5/2022 | Ogrinz | G06F 16/287 |
| | | | 707/798 |

FOREIGN PATENT DOCUMENTS

| KR | 10-2020-0052448 A | 5/2020 |
| KR | 10-2021-0045837 A | 4/2021 |

OTHER PUBLICATIONS

Yue Wang et al., "Efficient graph similarity join for information integration on graphs", Front. Comput. Sci., 2016, pp. 317-329, vol. 10, No. 2.

* cited by examiner

*Primary Examiner* — Apu M Mofiz
*Assistant Examiner* — Cindy Nguyen
(74) *Attorney, Agent, or Firm* — Sughrue Mion, PLLC (57) ABSTRACT

The present disclosure relates to a method of generating, by a terminal, an integrated graph using a distributed graph including: receiving source node information from a user; identifying, by a graph types module, a location of a graph database related to a type of a source node based on the source node information; requesting, by a graph manager module, graph data to an application corresponding to the location of the graph database; receiving the graph data from the application; and integrating, by a graph integration module, a node and an edge based on the source node and the graph data to generate the integrated graph.

7 Claims, 9 Drawing Sheets

METHOD OF GENERATING INTEGRATED GRAPH USING DISTRIBUTED GRAPH

CROSS-REFERENCE TO RELATED APPLICATION

This application claims priority to and the benefit of Korean Patent Application No. 10-2022-0014540, filed on Feb. 4, 2022, the disclosure of which is incorporated herein by reference in its entirety.

BACKGROUND

1. Field of the Invention

The present disclosure relates to a method of generating an integrated graph for integrated analysis between distributed graphs and an apparatus therefor.

2. DISCUSSION OF RELATED ART

It is not practically easy to store data that can be used by all applications in a graph form. For example, to generate a graph database to be used by applications during data collection, data analysis and processing, data storage (graph), and the use of the applications, an ontology design is required to define types of nodes/edges constituting the graph in advance and attribute values for each type.

In general, such ontology is separately generated and used for each application in order for performance and optimization, and in order to analyze graph databases used for different applications, the ontology that may include data of all applications needs to be redesigned, and thus the database needs to be reconstructed.

However, this method may have a structure in which resources are wasted and flexibility is lowered because it is necessary to re-generate the graph database for integrated analysis whenever the number of applications increases.

SUMMARY OF THE INVENTION

The present disclosure is directed to providing a method and apparatus for supporting integrated analysis for graph databases while maintaining the graph databases used by each application without change.

Objects of the present disclosure are not limited to the above-described objects. That is, other objects that are not described may be obviously understood by those skilled in the art to which the present disclosure pertains from the following detailed description.

According to an aspect of the present disclosure, there is provided a method of generating, by a terminal, an integrated graph using a distributed graph, including: receiving source node information from a user; identifying, by a graph types module, a location of a graph database related to a type of a source node based on the source node information; requesting, by a graph manager module, graph data to an application corresponding to the location of the graph database; receiving the graph data from the application; and integrating, by a graph integration module, a node and an edge based on the source node and the graph data to generate the integrated graph.

The method may further include receiving a number of hops from the user, in which the integrated graph may include as many layers as the number of hops.

The identifying of the location of the graph database may be based on a mapping file preset in the graph types module, and the mapping file may include location information of a graph database mapped to the type.

A node of the integrated graph may include (1) an identifier, (2) property, and (3) type information.

An edge of the integrated graph may include (1) an identifier of a node connected to the edge, (2) label information, and (3) type information connected to the edge.

The integrated graph may be generated based on the number of hops.

According to another aspect of the present disclosure, there is provided a terminal for generating an integrated graph using a distributed graph, including: an application programming interface (API) that receives source node information from a user; a graph types module that confirms a location of a graph database related to a type of a source node based on the source node information; a graph manager module that requests graph data to an application corresponding to the location of the graph database and receives the graph data from the application; and a graph integration module that generates the integrated graph by integrating a node and an edge based on the source node and the graph data.

According to still another aspect of the present disclosure, there is provided a terminal for generating an integrated graph using a distributed graph, including: a memory; and a processor that functionally controls the memory, in which the processor may receive source node information from a user, allow a graph types module to identify a location of a graph database related to a type of the source node based on the source node information, allows a graph manager module to request graph data to an application corresponding to the location of the graph database and receive the graph data from the application, and allow a graph integration module to generate the integrated graph by integrating a node and an edge based on the source node and the graph data.

BRIEF DESCRIPTION OF THE DRAWINGS

The accompanying drawings, which are included as part of the detailed description to assist understanding of the present disclosure, illustrate embodiments of the present disclosure and explain the technical features of the present disclosure together with the detailed description.

DETAILED DESCRIPTION OF EXEMPLARY EMBODIMENTS

Hereinafter, embodiments of the present disclosure will be described in detail with reference to the accompanying drawings. The same or similar components will be denoted by the same reference numerals independent of the drawing numerals, and overlapping description of the same or similar components will be omitted. In addition, the terms "module" and "unit" used for components in the following description are used only to simplify the disclosure. Therefore, these terms do not have meanings or roles that distinguish components from each other in themselves. Further, when it is decided that a detailed description of the known art related to the present disclosure may obscure the gist of the present disclosure, the detailed description will be omitted. Further, it should be understood that the accompanying drawings are provided only in order to allow exemplary embodiments of the present disclosure to be easily understood, and the spirit of the present disclosure is not limited by the accompanying drawings, but includes all the modifications, equivalents, and substitutions included in the spirit and the scope of the present disclosure.

Terms including ordinal numbers such as "first," "second," and the like, may be used to describe various components. However, these components are not limited by these terms. The terms are used only to distinguish one component from another component.

It is to be understood that when one component is referred to as being "connected to" or "coupled to" another component, the one component may be connected directly to or coupled directly to another component or may be connected to or coupled to another component with still another component interposed therebetween. On the other hand, it should be understood that when one element is referred to as being "connected directly to" or "coupled directly to" another element, it may be connected to or coupled to another element without other elements interposed therebetween.

Singular forms are intended to include plural forms unless the context clearly indicates otherwise.

It will be further understood that terms "include" or "have" used in the present disclosure specify the presence of features, numerals, steps, operations, components, parts, or combinations thereof described in the present disclosure, but do not preclude the presence or addition of one or more other features, numerals, steps, operations, components, parts, or combinations thereof.

Figure 1:
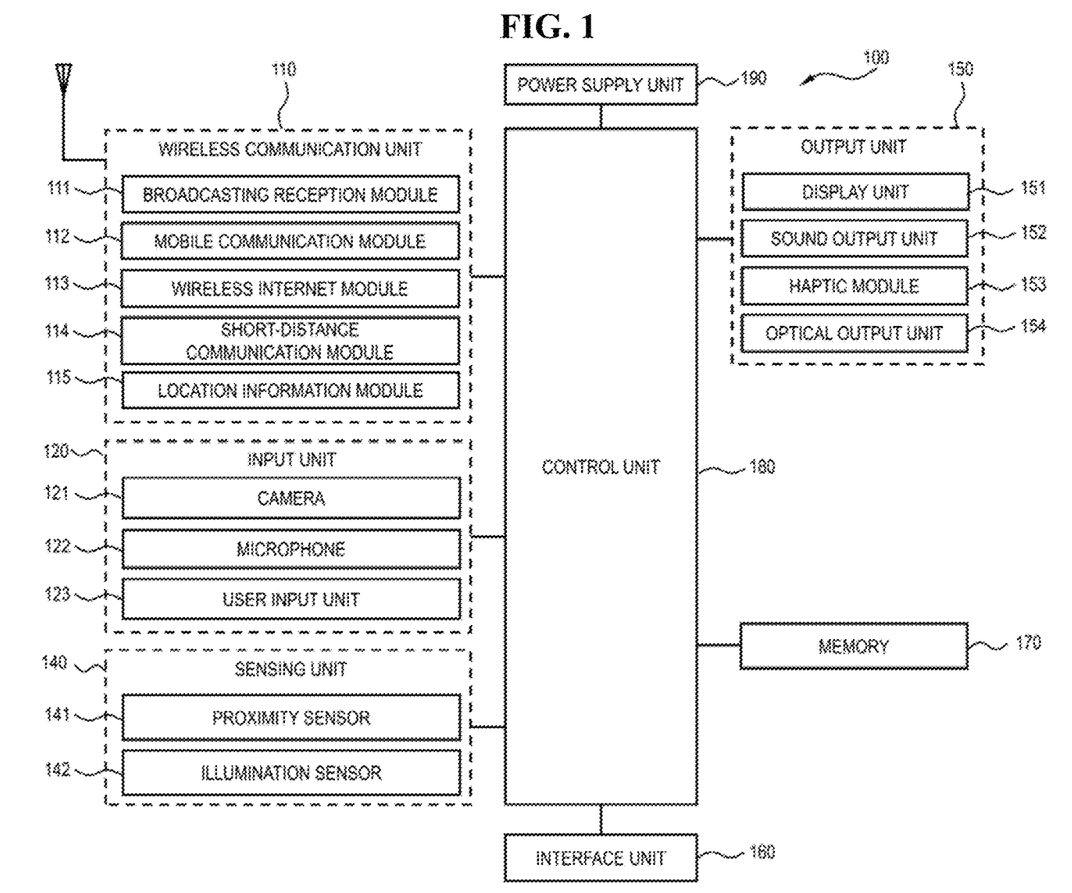
FIG. 1 is a block diagram for describing an electronic device according to the present disclosure.

FIG. 1 is a block diagram for describing an electronic device according to the present disclosure.

The electronic device 100 may include a wireless communication unit 110, an input unit 120, a sensing unit 140, an output unit 150, an interface unit 160, a memory 170, a control unit 180, a power supply unit 190, and the like. The components illustrated in FIG. 1 are not essential to implementing the electronic device, so the electronic device described herein may have more or fewer components than those described above.

More specifically, the wireless communication unit 110 of the components may include one or more modules which enable wireless communication between the electronic device 100 and a wireless communication system, between the electronic device 100 and other electronic devices 100, or between the electronic device 100 and an external server. In addition, the wireless communication unit 110 may include one or more modules which connect the electronic device 100 to one or more networks.

The wireless communication unit 110 may include at least one of a broadcast receiving module 111, a mobile communication module 112, a wireless Internet module 113, a short range communication module 114, and a location information module 115.

The input unit 120 may include a camera 121 or an image input unit for inputting an image signal, a microphone 122 or an audio input unit for inputting an audio signal, or a user input unit 123 (for example, a touch key, a push key, or the like) for receiving information from a user. Voice data or image data collected by the input unit 120 may be analyzed and processed as a control command of a user.

The sensing unit 140 may include one or more sensors for sensing at least one of information in the electronic device, information on the surrounding environment surrounding the electronic device, and user information. For example, the sensing unit 140 may include at least one of a proximity sensor 141, an illumination sensor 142, a touch sensor, an acceleration sensor, a magnetic sensor, a gravity sensor (G-sensor), a gyroscope sensor, a motion sensor, an RGB sensor, an infrared sensor (IR sensor), a finger scan sensor, an ultrasonic sensor, an optical sensor (for example, the camera 121), the microphone 122, a battery gauge, an environmental sensor (for example, a barometer, a hygrometer, a thermometer, a radiation detection sensor, a heat detection sensor, a gas detection sensor, or the like), and a chemical sensor (for example, an electronic nose, a healthcare sensor, a biometric sensor, or the like). Meanwhile, the electronic device disclosed herein may use a combination of pieces of information sensed by at least two or more of these sensors.

The output unit 150 is used to generate an output related to the sense of vision, hearing, touch or the like, and may include at least one of a display unit 151, a sound output unit 152, a haptic module 153, and an optical output unit 154. The display unit 151 may form a mutual layer structure with the touch sensor or may be integrally formed with the touch sensor, thereby implementing a touch screen. The touch screen may function as the user input unit 123 which provides an input interface between the electronic device 100 and the user, and may provide an output interface between the electronic device 100 and the user.

The interface unit 160 serves as a path of various types of external devices connected to the electronic device 100. The interface unit 160 may include at least one of a wired/wireless headset port, an external charger port, a wired/wireless data port, a memory card port, a port for connecting devices including an identity module, an audio input/output (I/O) port, a video I/O port, an earphone port, and the like. The electronic device 100 may perform appropriate control related to the connected external device in response to the connection of the external device to the interface unit 160.

In addition, the memory 170 stores data for supporting various functions of the electronic device 100. The memory 170 may store a plurality of application programs (or applications) that are driven by the electronic device 100, and data and instructions for operating the electronic device 100. At least some of these application programs may be downloaded from the external server via the wireless communication. In addition, at least some of these application programs may exist on the electronic device 100 from the time of shipment for basic functions (for example, an incoming and outgoing call function, a message reception and transmission function) of the electronic device 100. Meanwhile, the application program may be stored in the memory 170 and installed on the electronic device 100, and thus may be driven by the control unit 180 to perform the operation (or function) of the electronic device.

In addition to the operation related to the application program, the control unit 180 typically controls the overall operation of the electronic device 100. The control unit 180 may provide or process appropriate information or a function to a user by processing signals, data, information, and the like, which are input or output through the above-described components, or by driving the application program stored in the memory 170.

In addition, the control unit 180 may control at least some of the components described with reference to FIG. 1 to drive the application program stored in the memory 170. In addition, the control unit 180 may operate at least two or more of the components included in the electronic device 100 in combination with each other to drive the application program.

The power supply unit 190 receives power from an external power supply and an internal power supply under the control of the control unit 180 and supplies the received power to each component included in the electronic device 100. The power supply unit 190 includes a battery which may be a built-in battery or a replaceable type battery.

At least some of the components may operate in cooperation with each other in order to implement an operation, control, or a control method of the electronic device according to various embodiments described below. In addition, the operation, control, or control method of the electronic device may be implemented on the electronic device by driving at least one application program stored in the memory 170.

In the present disclosure, the electronic device 100 may be collectively referred to as a terminal.

Figure 2:
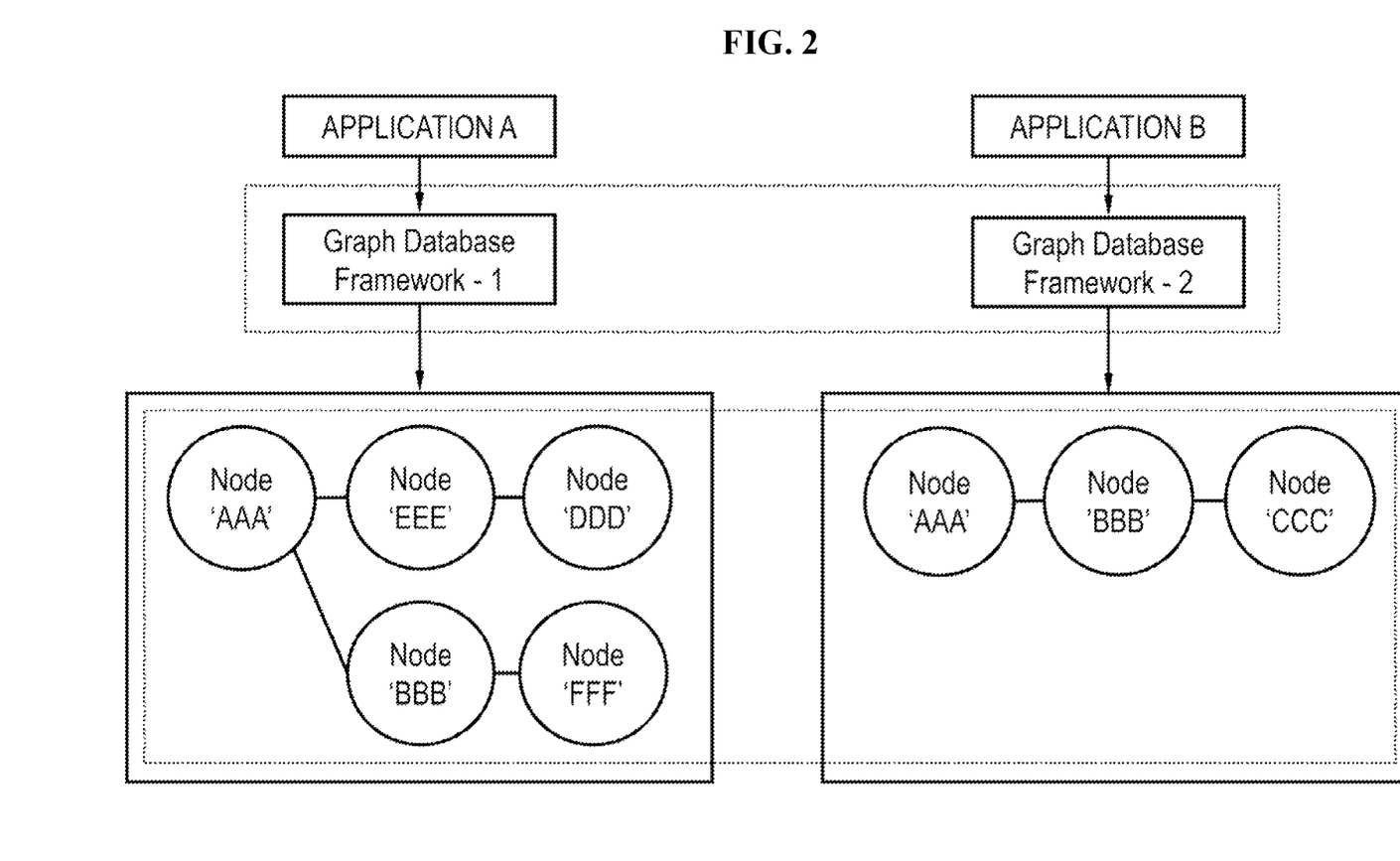
FIGS. 2 and 3 are examples of a general graph analysis method applicable to the present disclosure.
Figure 3:
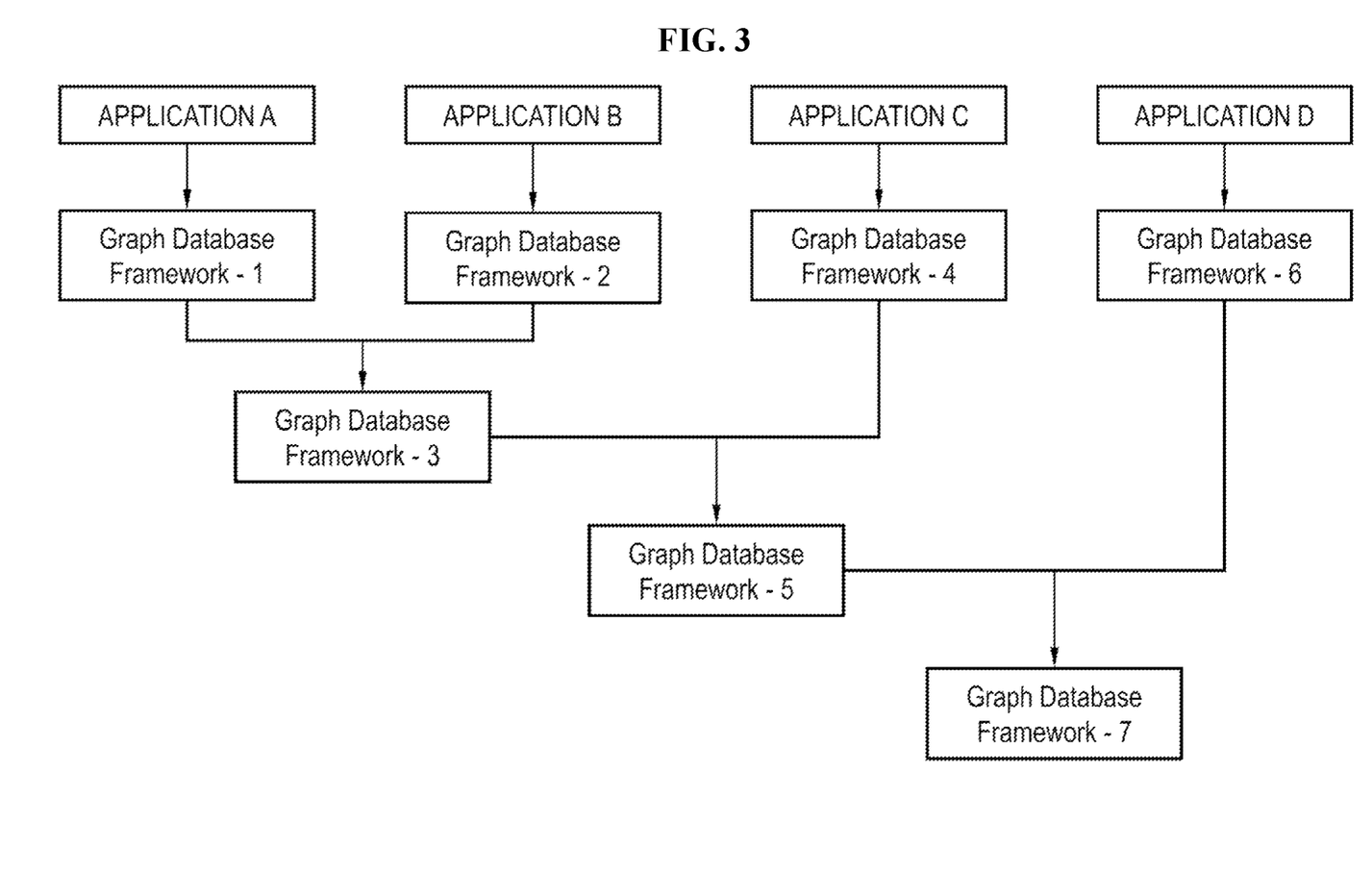

FIGS. 2 and 3 are examples of a general graph analysis method applicable to the present disclosure.

Referring to FIG. 2, applications A and B may have different graph database frameworks. In this case, as a limitation of data representation for each node due to factors such as a different storage amount for each database, the representations of graphs generated through different frameworks may be different from each other.

Referring to FIG. 3, in order to merge graph databases generated through these different applications, after analyzing ontology whenever the graph databases are merged, the graph database framework needs to be redesigned.

Figure 4:
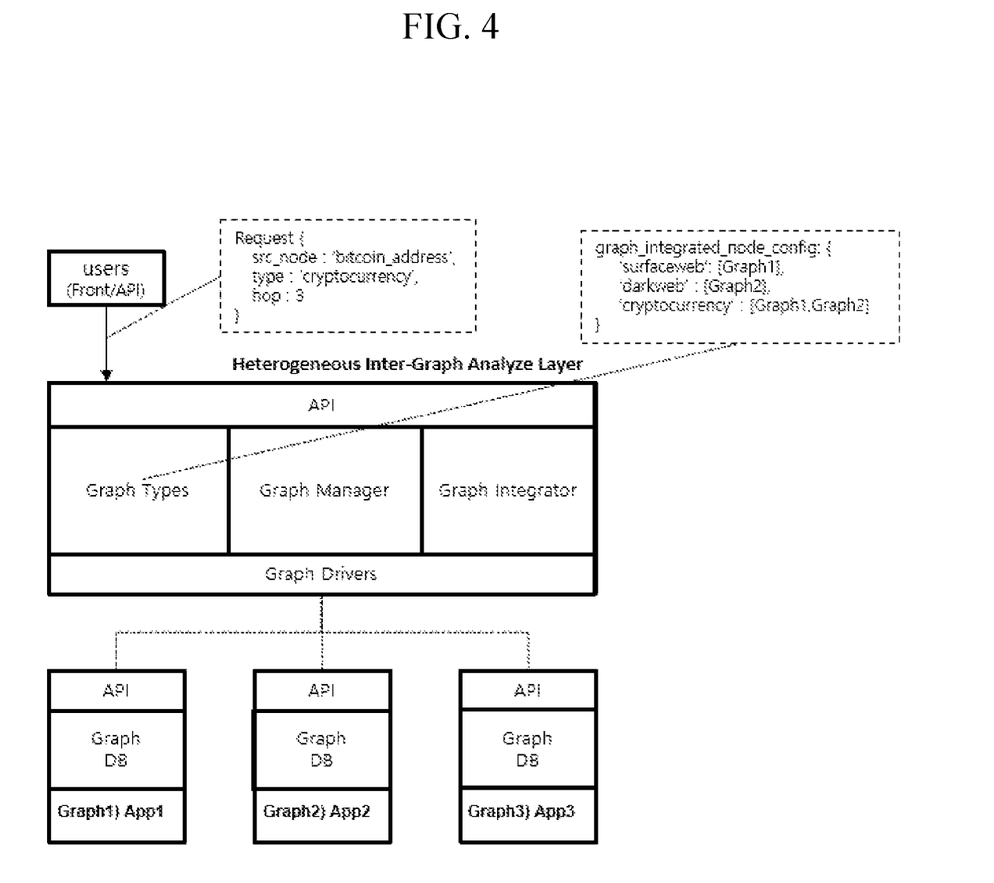
FIG. 4 is an example of a graph analysis layer to which the present disclosure may be applied.

FIG. 4 is an example of a graph analysis layer to which the present disclosure may be applied.

Referring to FIG. 4, the graph analysis layer is included in the terminal and may include an application programming interface (API), graph types, a graph manager, graph drivers, a graph manager, and a graph integrator. For example, each component may perform the following operation.

(1) Graph Types: A module that manages and informs of locations of graph databases corresponding to each type of graph nodes.

(2) Graph Manager: A module that receives an API request and controls and manages a module constituting each integrated graph analysis.

(3) Graph Drivers: A module that fetches data by calling each graph database that is distributed with requests from a graph manager.

(4) Graph Integrator: A module that integrates data fetched from a graph driver.

The following is an embodiment of a terminal including a graph analysis layer.

The terminal may receive a user request through the activated API.

Based on the user request, the terminal may identify the associated graph database through the graph types module, starting with an analysis target node (src_node).

Thereafter, the graph manager module of the terminal may request and acquire graph data to and from a graph-based application suitable for the node type through the graph drivers.

The terminal may reconstruct (integrate) a node/edge through the graph integrator module with respect to the acquired graph data.

The terminal may expand the integrated graph layer (the number of analysis hops) by repeating the above-described data acquisition and node/edge reconstruction of the graph.

Figure 5:
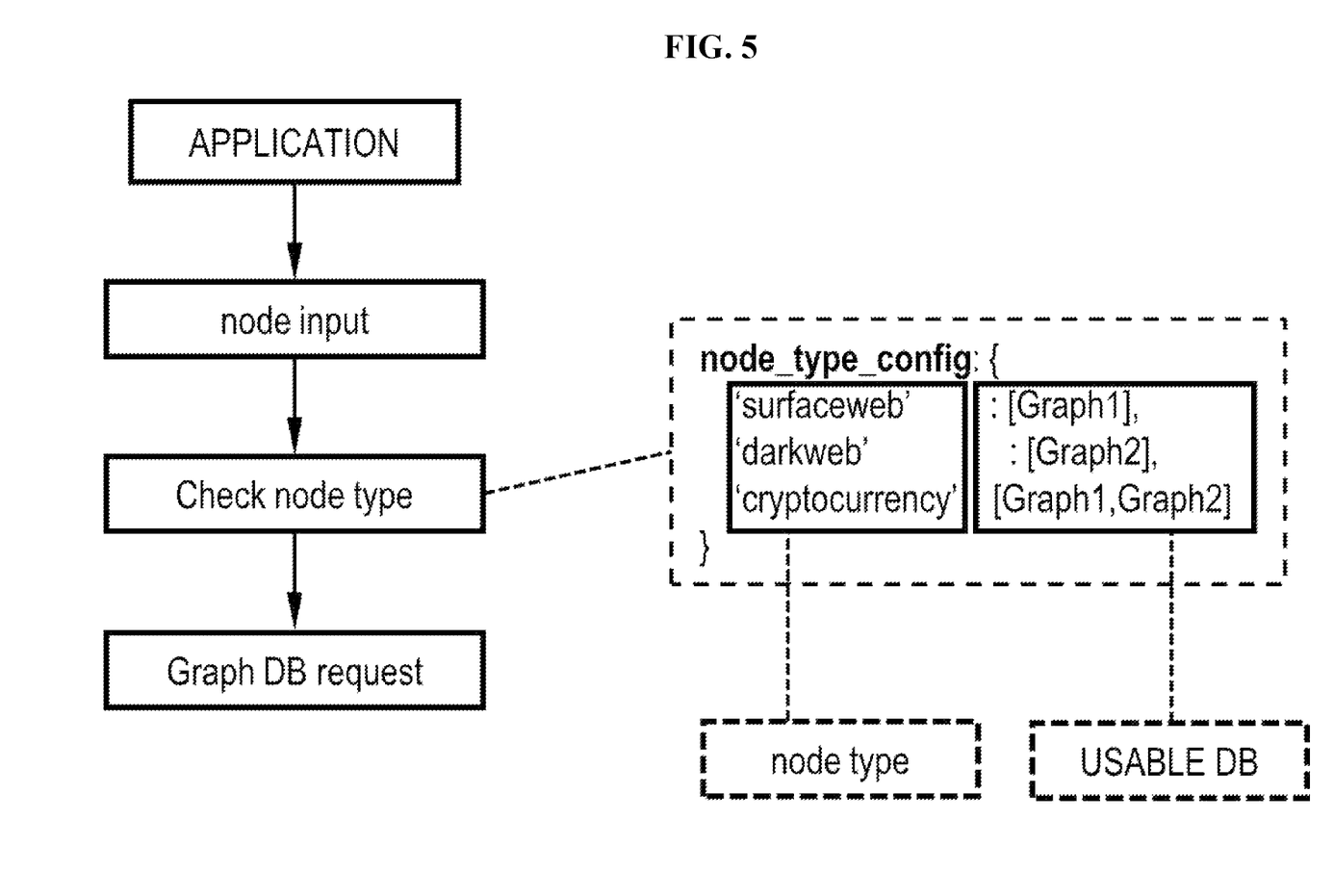
FIG. 5 is an embodiment of a graph type module to which this specification may be applied.

FIG. 5 is an embodiment of the graph types module to which the present disclosure may be applied.

Referring to FIG. 5, the graph types module may identify a usable graph database by identifying a pre-defined type config file based on the type of the input node (e.g., src_node).

The graph types module may identify a graph database and notify the graph manager module of the identified graph database, and the graph manager module may request graph data to the corresponding graph database. When there are two or more graph databases available through the identified node type, the terminal may request graph data to all graph databases.

Table 1 below is an example of node types

TABLE 1 node_type_config :{
  'node_type1':[graph1,graph2],
  'node_type2':[graph2,graph3],
  'node_type3':[graph1,graph3]
}

Referring to Table 1, the graph types module may include the graph database corresponding to the node type.

Thereafter, the graph manager may request graph data through cross-analysis to the identified graph database.

Table 2 below is an example of graph reconstruction.

TABLE 2

```
"get_flow_analysis": {
  "nodes": [
    {
      "graph_id": "3660419168",
      "property": "1AXUTu9y.........",
      "type": "bitcoin"
    },
    {
      "graph_id": "431853600",
      "property": "https://www.........",
      "type": "surfwebpage"
    },
    {
      "graph_id": "27378896912",
      "property": "Chainal.......",
      "type": "surfwebpage"
    },
    {
      "graph_id": "3655376952"
      "property":" 1Cq..........."
      "type": "address",
    }
  ...],
  "edges": [
    {
      "from": "3660419168",
      "to": "3658817536",
      "label": "surfwebpage",
      "type": "janus-eyez"
    },
    {
      "from": "3660419168",
      "to": "431853600",
      "label": "surfwebpage",
      "type": "janus-eyez"
```

TABLE 2-continued

```
    },
    {
      "from": "3660419168",
      "to": "27378896912",
      "label": "surfwebpage",
      "type": "janus-eyez"},
    ...
  ]}
```

Referring to Table 2, the graph integrator may acquire unprocessed graph data from the graph database through the graph manager, convert the graph data acquired through the cross analysis into a predefined graph form, and integrate (reconstruct) nodes/edges.

For example, the reconstructed graph data may have the following format.
 (1) Node: Including graph_id, property, type, or the like.
  graph_id: ID on graph
  property: Value (e.g., Bitcoin address, site URL, etc.) of property
  type: Attribute (characteristic) of node
 (2) Edges: Including from, to, label, type, etc.
  from: graph_id in edges relationship (from-to)
  to: graph_id in edges relationship (to-from)
  label: Edges relationship information (which edge type)
  type: Information (for example, in case of address-bitcoin, from [graph_id] type is address/to and [graph_id] type is bitcoin)

The terminal may expand the integrated graph by repeating the above-described operation a number of times corresponding to the number of hops (layers) requested by the user.

Figure 6:
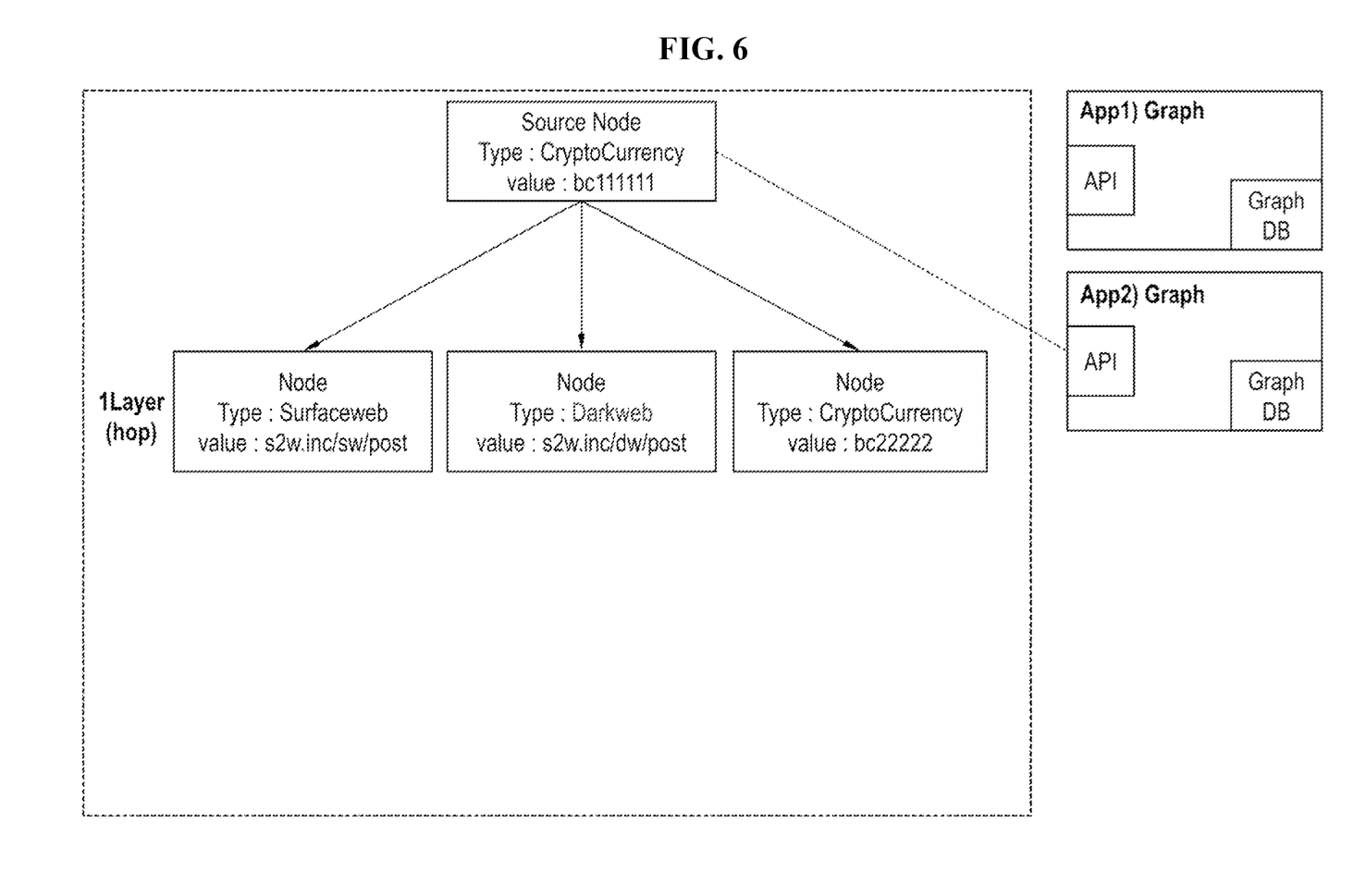
FIGS. 6 to 8 show an embodiment of an integrated graph expansion to which the present disclosure may be applied.
Figure 7:
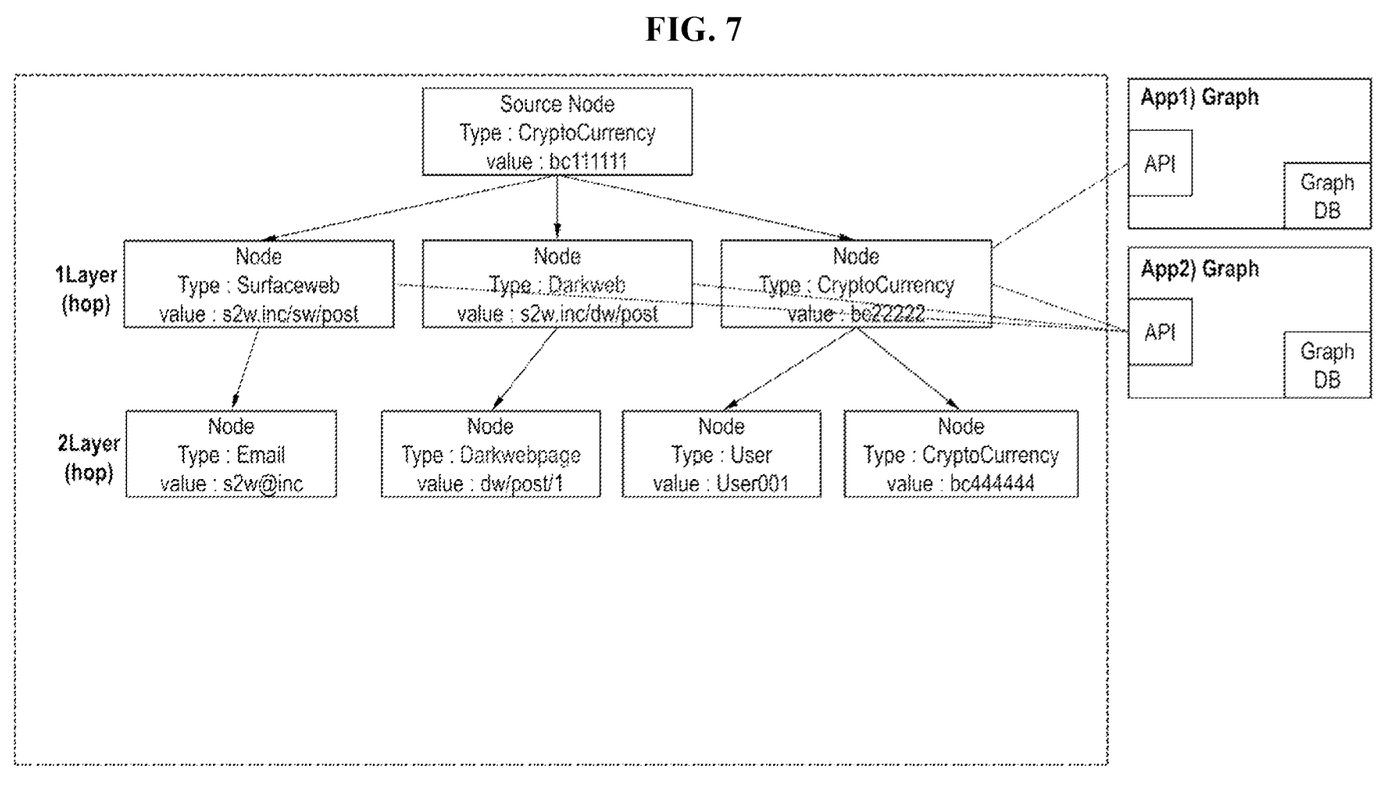
Figure 8:
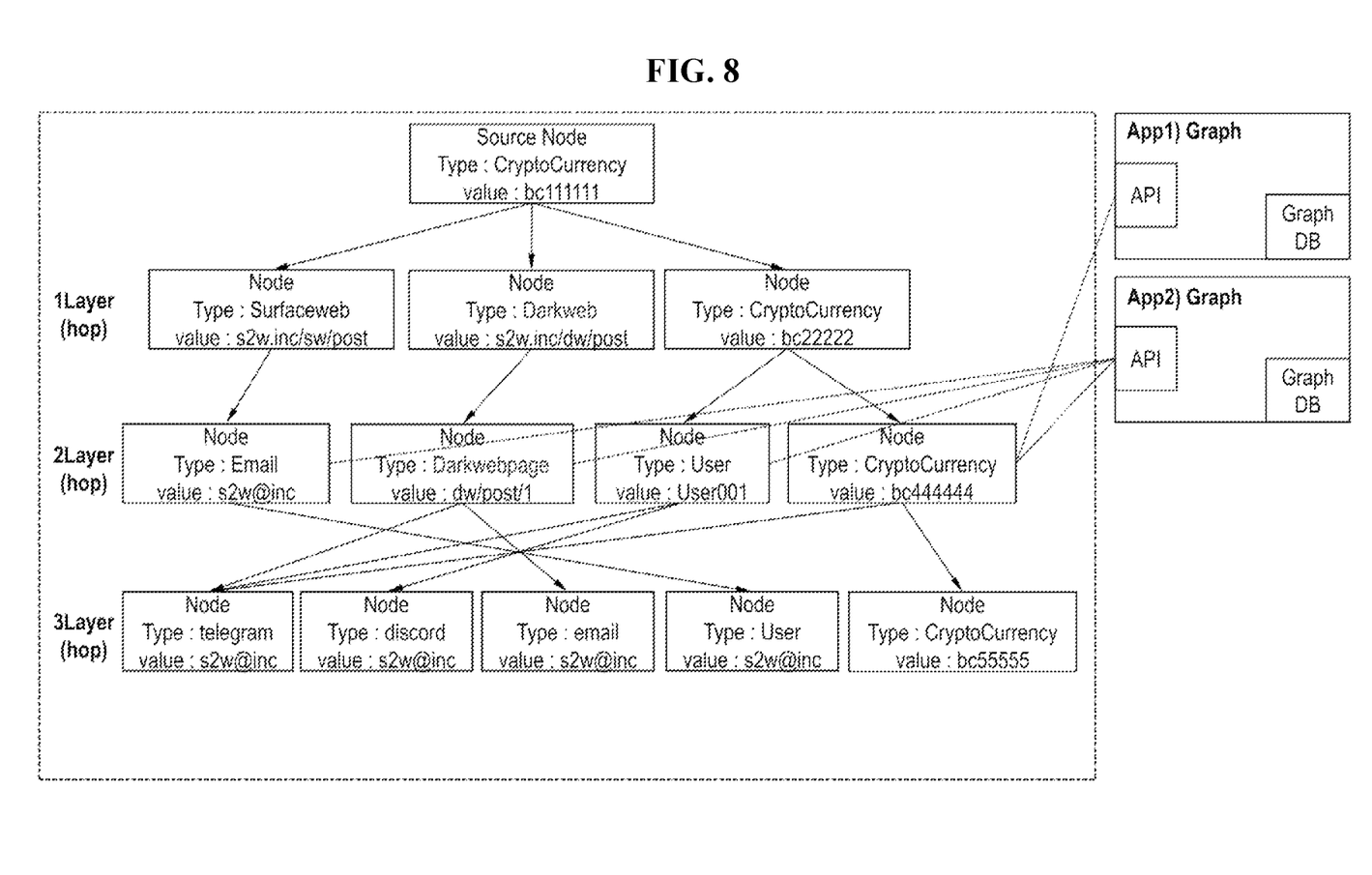

FIGS. 6 to 8 show an embodiment of an integrated graph expansion to which the present disclosure may be applied.

Referring to FIGS. 6 to 8, the integrated graph expansion when the number of hops is 3 is exemplified.

Referring to FIG. 6, the terminal may identify the input source node type, acquire graph data through the cross-analysis in the graph DB of App2, and integrate the acquired graph data.

Referring to FIGS. 7 and 8, the terminal may identify the type of nodes of the next layer, identify the graph data through the cross analysis in the related graph DB, and integrate the identified graph data.

When a graph is expanded and analyzed, as the number of analysis operations increases, the size of the graph becomes too large, and therefore the analysis may not be performed indefinitely. In addition, when the graph generation control is performed to control too many graphs, or when there is only an amount of data connected to a specific node type is large, only data related to a specific node remains in the graph, and therefore overfitting analysis may be performed.

Accordingly, the terminal may control the number of neighbor nodes (lower layer nodes) generated by a specific node in the graph to be less than or equal to a specific value. As a result, in the case of a specific node, it is possible to control the possibility of a large number of lower layer nodes.

In addition, the number of neighbor nodes that may be generated for each node may be limited to a specific value or less as it goes to the lower layer (for example, in a node of layer 1, the number of possible sub-nodes of a node is 10, and in a node of layer 2, the number of possible sub-nodes of a node is 5).

In addition, since meaningless data may be expressed in too much graph data, the terminal may solve the problem of system resource occupancy for large-scale graph search and improve graph accuracy by limiting the number of layers (hops) upon user request.

In addition, it is possible to perform the data analysis between different graph databases without reconfiguring the already generated graph database.

Figure 9:
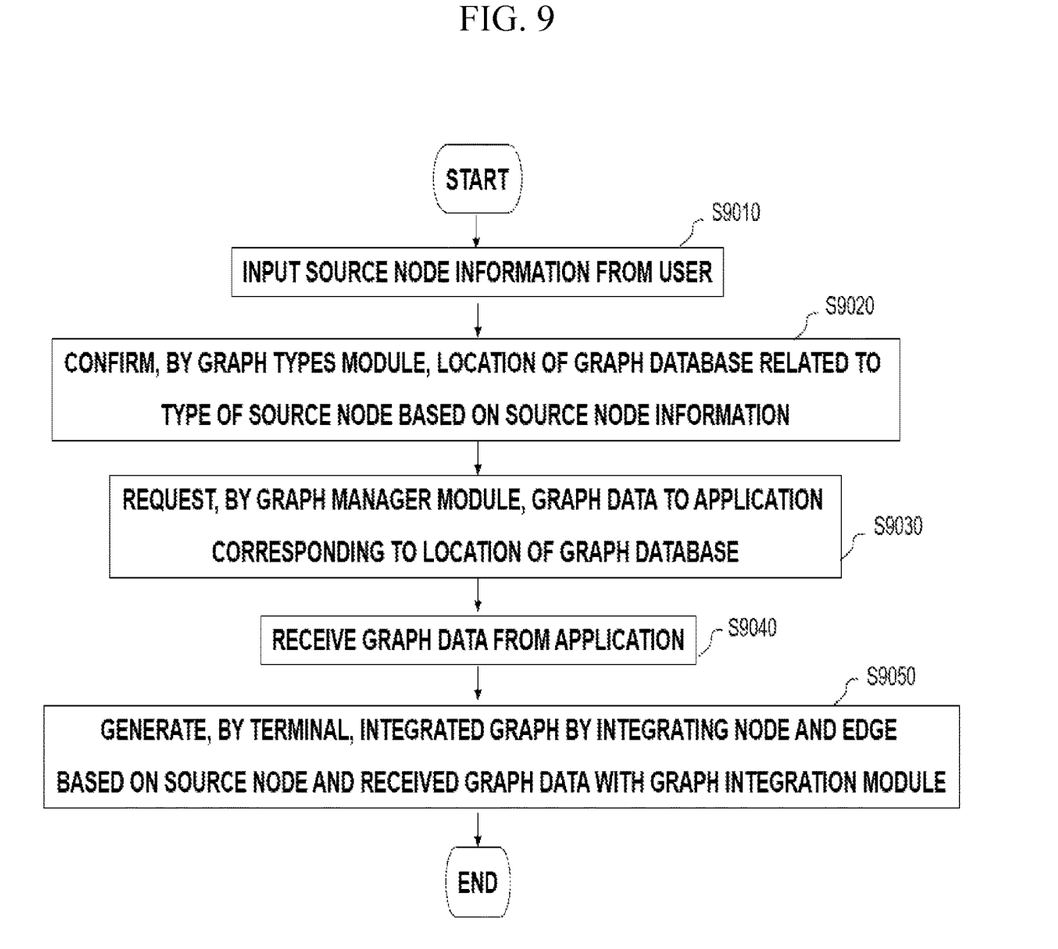
FIG. 9 is an embodiment of a terminal to which the present disclosure may be applied.

FIG. 9 is an embodiment of the terminal to which the present disclosure may be applied.

Referring to FIG. 9, the terminal may include the graph analysis layer described above.

The terminal receives source node information from the user (S9010). For example, the terminal may receive a request message including the source node information from the user through the API. The request message may include the number of hops corresponding to the number of layers of the reconstructed graph.

The terminal allows the graph types module to identify the location of the graph database related to the type of the source node based on the source node information (S9020). For example, the source node information may include type information of the node. The graph types module may identify location information of a graph database mapped to type information based on a preset mapping file. The mapping file may be set based on the cross analysis technique.

The terminal allows the graph manager module to request graph data to the application corresponding to the location of the graph database (S9030). When the number of pieces of location information of the graph database indicates two or more, the terminal may request graph data to all applications.

The terminal receives the graph data from the application (S9040).

The terminal generates an integrated graph by integrating the node and the edge based on the source node and the received graph data through the graph integration module (S9050). For example, the node may include (1) an identifier, (2) a property, and (3) type information. In addition, the edge may include (1) an identifier of a node connected to an edge, (2) label information, and (3) type information connected to an edge.

The integrated graph may include as many layers as the above-described number of hops.

The present disclosure described above can be embodied as a computer readable code on a medium on which a program is recorded. A computer readable medium may include all kinds of recording devices in which data that may be read by a computer system is stored. Examples of the computer readable medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disk, an optical data striate, and the like, and also include a medium implemented in the form of carrier waves (for example, transmission through the Internet). Therefore, the above-described detailed description is to be interpreted as being illustrative rather than being restrictive in all aspects. The scope of the present disclosure is to be determined by reasonable interpretation of the claims, and all modifications within an equivalent range of the present disclosure fall in the scope of the present disclosure.

According to an embodiment of the present disclosure, it is possible to support integrated analysis for graph databases while maintaining the graph databases used by each application without change, instead of re-generating an integrated graph database.

Effects which may be achieved by the present disclosure are not limited to the above-described effects. That is, other objects that are not described may be obviously understood by those skilled in the art to which the present disclosure pertains from the following description.

In addition, although services and embodiments have been mainly described hereinabove, these are only examples and do not limit the present disclosure. Those skilled in the art to which the present disclosure pertains may understand that several modifications and applications that are not described in the present disclosure may be made without departing from the essential characteristics of the present services and embodiments. For example, each component described in detail in the embodiments may be modified. In addition, differences associated with these modifications and applications are to be interpreted as being included in the scope of the present disclosure as defined by the following claims.

What is claimed is:

1. A method of generating, by a terminal, an integrated graph using a distributed graph, the method comprising:
    receiving a request message from a user, the request message including source node information and information on a number of hops corresponding to a number of layers of the integrated graph;
    based on the source node information, identifying, by a graph types module, a location of a graph database related to a type of a source node among a plurality of graph databases respectively corresponding to a plurality of applications;
    requesting, by a graph manager module, graph data to an application corresponding to the location of the graph database among the plurality of applications;
    receiving the graph data from the application; and
    integrating, by a graph integration module, a node and an edge based on the source node and the graph data to generate the integrated graph,
    wherein the number of neighbor nodes of a specific node among a plurality of nodes of the integrated graph is set to be less than or equal to a specific value, the neighbor nodes being nodes in a lower layer of the specific node among the layers of the integrated graph.

2. The method of claim 1, wherein the identifying of the location of the graph database is based on a mapping file preset in the graph types module, and
    the mapping file includes location information of a graph database mapped to the type.

3. The method of claim 1, wherein a node of the integrated graph includes (1) an identifier, (2) property, and (3) type information.

4. The method of claim 3, wherein an edge of the integrated graph includes (1) an identifier of a node connected to the edge, (2) label information, and (3) type information connected to the edge.

5. The method of claim 1, wherein the integrated graph is generated based on the number of hops.

6. A terminal for generating an integrated graph using a distributed graph, the terminal comprising:
    an application programming interface (API) that receives a request message from a user, the request message including source node information and information on a number of hops corresponding to a number of layers of the integrated graph;
    a graph types module that confirms, based on the source node information, a location of a graph database related to a type of a source node among a plurality of graph databases respectively corresponding to a plurality of applications;
    a graph manager module that requests graph data to an application corresponding to the location of the graph database among the plurality of applications and receives the graph data from the application; and
    a graph integration module that generates the integrated graph by integrating a node and an edge based on the source node and the graph data,
    wherein the number of neighbor nodes of a specific node among a plurality of nodes of the integrated graph is set to be less than or equal to a specific value, the neighbor nodes being nodes in a lower layer of the specific node in the layers of the integrated graph.

7. A terminal for generating an integrated graph using a distributed graph, the terminal comprising:
    a memory; and
    a processor that functionally controls the memory,
    wherein the processor is configured to:
    receive a request message from a user, the request message including source node information and information on a number of hops corresponding to a number of layers of the integrated graph,
    control a graph types module to identify, based on the source node information, a location of a graph database related to a type of the source node among a plurality of graph databases respectively corresponding to a plurality of applications,
    control a graph manager module to request graph data to an application corresponding to the location of the graph database among the plurality of applications, and receive the graph data from the application, and
    control a graph integration module to generate the integrated graph by integrating a node and an edge based on the source node and the graph data,
    wherein the number of neighbor nodes of a specific node among a plurality of nodes of the integrated graph is set to be less than or equal to a specific value, the neighbor nodes being nodes in a lower layer of the specific node in the layers of the integrated graph.

* * * * *